United States Patent Office 3,721,167
Patented Mar. 20, 1973

3,721,167
EXPOSURE VALUE CONTROLLING APPARATUS
Mitsutoshi Ogiso, Kawasaki-shi, Japan, assignor to Canon Kabushiki Kaisha, Tokyo, Japan
Filed Oct. 29, 1969, Ser. No. 872,030
Claims priority, application Japan, Nov. 6, 1968, 43/81,430
Int. Cl. G03b 7/08
U.S. Cl. 95—10 CT         15 Claims

ABSTRACT OF THE DISCLOSURE

Timing circuit arrangements for control of camera aperture opening and shutter speed wherein a single timing capacitor controls aperture opening in one timing operation during charging thereof and thereafter controls shutter speed in a second timing operation during discharge thereof.

---

The present invention relates to an exposure value controlling apparatus for use in cameras and more particularly an apparatus for controlling the exposure value in cameras, in which a capacitor of a time constant circuit with a first resistive means is charged by a power source and said capacitor may be switched from said first resistive means to a second resistive means through which is discharged said capacitor to control a shutter speed in camera. An electronic shutter driving circuit is well known in the art in which the intensity of light for exposure is stored in the first stage charging of a capacitor and then the shutter is actuated in the second stage (auxiliary) charging of the same capacitor. However, in such a case, it is very difficult to design a driving circuit having a wide dynamic range. Accordingly the present invention serves to eliminate the above described defect.

In case of an electronic shutter of the type in which a shutter speed is previously set (which will be referred to as "fixed shutter speed preference photography" hereinafter), the conventional system requires two electronic circuits, that is one circuit for setting a shutter speed and the other for determining an aperture of a photographic lens in response to said determined or selected shutter speed previously fixed or set.

However, in accordance with the present invention, the charging characteristic of one common capacitor may be utilized for example in setting a desired aperture while the shutter is actuated at a present shutter speed by utilizing the discharge characteristic of the common capacitor. Thus it is seen that both of the aperture and the shutter speed and thus the exposure value may be advantageously controlled by the same triggering circuit only by operating a selection switch. The automatic or manual exposure control may be effected by varying and modifying said first and/or second resistive means. The range of the linear operation of the resistive means in response to the incident light may be widened by constituting said first and/or second resistive means with at least one photo-responsive element. The same switching circuit may be selectively used for automatic or manual photography, and at least one of the fixed shutter speed photography, the programmed shutter photography and the fixed aperture photography may be accomplished by utilizing, for example, as first resistive means a plurality of photoconductor elements each having a different incident light versus output-current characteristic.

Accordingly, one of the objects of the present invention is to provide apparatus for controlling the exposure value for cameras in which a capacitor of a time constant circuit with a first resistive means is charged by a power source and said capacitor is switched to a second resistive means from said first resistive means so that said capacitor may be discharged through said second resistive means.

Another object of the present invention is to provide apparatus for controlling the exposure value for cameras in which a photoconductive element is utilized as said first resistive means and the second resistive means is of adjustable or variable type. Another object of the present invention is to provide apparatus for controlling the exposure value for cameras in which a plurality of photoconductive elements, each having a different incident-light vs. output-current characteristic, are utilized as said first resistive means in such a manner that they may be selectively connected to said capacitor, whereby the same single switching circuit may be used for at least two of fixed shutter speed photography, programmed shutter photography and fixed aperture photography on a manual or automatic basis. Another object of the present invention is to provide apparatus for controlling the exposure value for cameras in which a variable or adjustable resistor is utilized as the first resistive means while the second resistive means is a photoconductive element whose resistance varies in response to the brightness of a subject to be photographed and an aperture. Another object of the present invention is to control the times at which the switching circuit is triggered by applying to the same switching circuit different charging and discharge voltages of said capacitor. This is advantageous for control of an aperture during the charging of the capacitor with control of the shutter speed during the discharge; for control of the shutter at a certain speed during the charging with control of the shutter at a different speed during the discharge; or for carrying out a plurality of photographic operations or making a double-exposure at the same shutter speed.

Another object of the present invention is to utilize a Schmitt circuit as a switching circuit.

Another object of the present invention is to provide an apparatus having a switching circuit which may be used with any film having different sensitivity by connecting an adjustable resistor to the collector of one transistor of the Schmitt circuit, thereby varying its trigger voltage. Another object of the present invention is to provide an apparatus having a switching circuit in which an adjustable resistor is connected to the base electrode of an output transistor of the Schmitt circuit, thereby varying the trigger voltage for said output transistor in response to an aperture set. Still another object of the present invention is to provide an apparatus with an input circuit which comprises a first time constant circuit with a capacitor and a second time constant circuit having the capacitor common to the first time constant circuitry, with the first and second time constant circuits being connected by means of a diode which is rendered conductive during the charging of the capacitor and is rendered non-conductive during the discharge of the capacitor. Another object of the present invention is to use as an input circuit a comparator circuit such as a bridge circuit, differential amplifier, etc.

Another object of the present invention is to provide an apparatus having an input circuit in which a constant voltage element such as a Zener diode, a voltage regulator tube, etc. is connected to the capacitor so that first the switching circuit is actuated by the charged voltage of said capacitor and thereafter the switching circuit is actuated again under the control of the break-down voltage of the constant voltage element of the type described above.

Another object of the present invention is to provide an apparatus having an input circuit in which the first and/or second resistive means comprise a plurality of photoconductive elements to provide a resistive circuit assuring a wide range of linear operation.

Another object of the present invention is to provide an apparatus having an input circuit in combination with a switching circuit in which the second resistive means of the input circuit is connected to the input terminal of the switching circuit and wherein the holding action of a switch for selectively connecting the capacitor to the second resistive means is releaseably controlled by an electromagnet incorporated in the switching circuit.

Another object of the present invention is to provide an apparatus with an input circuit in which the capacitor is adjustable in accordance with an exposure index. Alternatively, the adjustment of the arrangement described above may be accomplished by rendering adjustable the parameters of the switching circuit.

Another object of the present invention is to provide an apparatus in which an external means such as flash circuit may be controlled when the capacitor is discharged. According to one preferred embodiment of the invention, the dark resistance of the photoconductive element may be controlled by the adjustable resistor connected in parallel with the photoconductive element in order that the charged voltage of the capacitor may easily reach the break-down voltage of the diode. When FET (field effect) transistors are employed in the switching circuit, the control of the light value may be made with a higher degree of accuracy. Instead of the photoconductive elements, photodiodes may be employed thereby improving their rising and falling characteristics. Furthermore, photocells may be employed. In these cases, semiconductive elements such as transistors serve as an adjustable resistive means.

According to another preferred embodiment of the present invention, a shutter speed is set by said second resistive means while the aperture of the photoconductive element, as a first resistor has its area changed in response to said shutter speed. The Zener diode is connected in parallel with the capacitor so that the switching circuit may be actuated at a voltage during the capacitor being still charged, thereby controlling an aperture of a photographic lens to a value in response to the given shutter speed. After the aperture setting operation, the capacitor is connected to the second resistive means through which the capacitor discharges under the control of the break-down voltage of the Zener diode, whereby the shutter speed is controlled.

The above and other objects, features and advantages of the present invention will become more apparent from the following description of illustrative embodiments thereof taken in conjunction with the accompanying drawing, in which.

Figure 1:
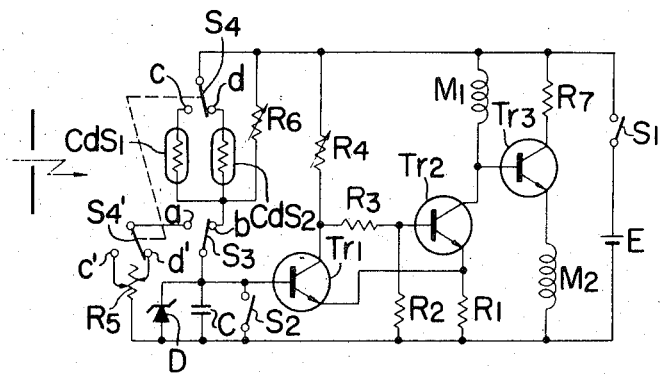
FIG. 1 is a circuit diagram of one embodiment of an exposure value controlling apparatus in accordance with the present invention.

It should be noted that the same references used indicate the identical components throughout the entire figures and thus for the simplicity an overlapped explanation to the drawing will be omitted herein.

Figure 4:
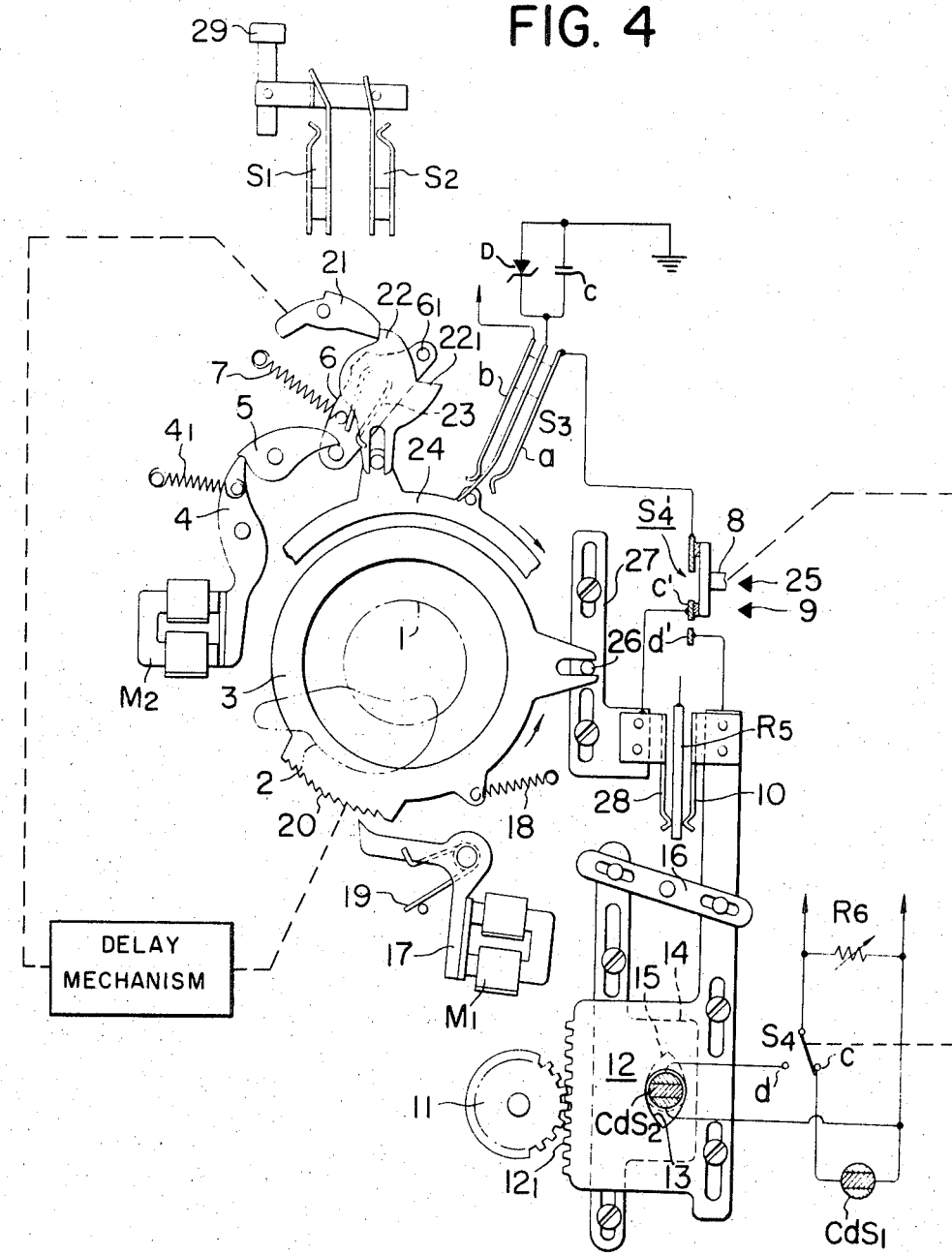
FIG. 4 is a schematic view illustrating only the essential mechanical parts of an apparatus in which the present invention is embodied.

FIG. 1 is a circuit diagram of an exposure value controlling apparatus in accordance with the present invention, in which a Schmitt circuit is used as a switching circuit. $Tr_1$ and $Tr_2$ are NPN type transistors constituting the above Schmitt circuit. Photoconductors $CdS_1$ and $CdS_2$ as a first resistive means have different incident-light versus output-current characteristics of for example about 0.5 and 1.0 respectively, and the photoconductor $CdS_1$ is used for the programmed shutter photography while the photoconductor $CdS_2$ for the fixed shutter speed photography. Reference character C designates a capacitor in a time constant circuit to be charged by a voltage source E; $M_1$, an electromagnet adapted to lock an adjustment ring 3 (see FIG. 4) for an aperture diaphragm 2 which determines an aperture 1 of a photographic lens; and $M_2$ an electromagnet adapted to lock a shutter actuating mechanism consisting of parts 4, 5, 6 and 7 (see FIG. 4). Suitable adjustments of the Schmitt circuit of FIG. 1 especially for temperature compensation may be made when the resistances of resistors from $R_1$ to $R_4$ and $R_7$ are suitably selected. A resistor $R_5$ serves as a second resistive means and is a variable or adjustable resistor used in fixed shutter speed photography. Reference character $S_1$ designates a start switch; $S_2$, a switch for short-circuiting the capacitor C; $S_3$ and $S_4$, change-over switches; and D, a constant voltage element such as a Zener diode or voltage regulator tube.

Figure 2:
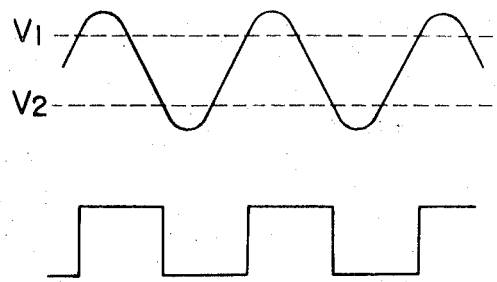
FIG. 2 is a series of voltage waveforms for explanation of the operation of a Schmitt circuit used in the circuit of FIG. 1.

FIG. 2 is a diagram for explanation of the operation of the Schmitt circuit of FIG. 1. Reference character $V_1$ designates an "On-Level" voltage while $V_2$, an "Off-Level" voltage of said Schmitt circuit. The output corresponding to the input as shown at the top of FIG. 2 is derived therefrom as a square waveform as shown at the bottom of FIG. 2.

Figure 3:
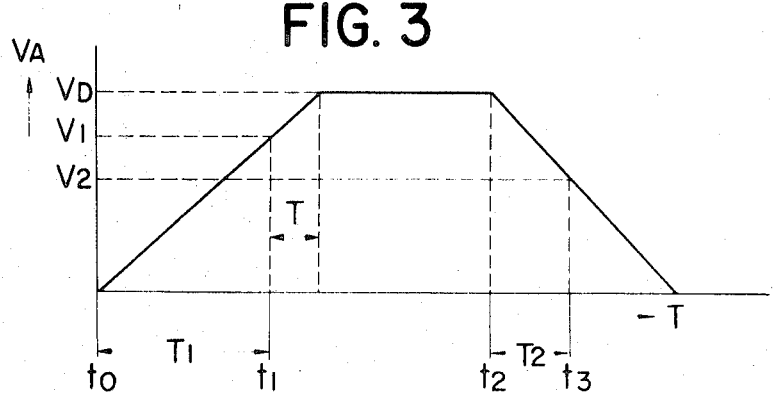
FIG. 3 is a further voltage waveform for explanation of control of the circuit of FIG. 1.

First, the case of the fixed shutter speed photography by the apparatus of the present invention will now be described. When a selection button 8 (FIG. 4) is set to a mark 9 representing the fixed shutter speed photography, the switch $S_4$ is connected to a contact $d$ so that the photoconductor $CdS_2$ ($\gamma=1$) may be incorporated in the input circuit and at the same time the switch $S_4'$ associated with the switch $S_4$ is connected to a contact $d'$ so that a sliding arm 10 of the resistor $R_5$ is connected to a contact $a$ of the switch $S_3$. Thereafter, the shutter speed is set by a shutter speed setting dial so that a pinion 11 integral or interlocked therewith and in mesh with a rack $12_1$ causes a member 12 to slide so as to slide the sliding arm 10 attached thereto along the resistor $R_5$, thereby selecting the resistance thereof to a predetermined value in response to the selected shutter speed. Concurrently, the aperture of the photoconductor $CdS_2$ is adjusted in response to the selected shutter speed by a mechanism consisting of an aperture setting opening 13 of the member 12 and an aperture setting opening 15 of an underlying plate 14. The member 12 and the underlying plate 14 are interconnected by means of a connecting lever 16. When the shutter is charged, the switch $S_1$ is opened while the switches $S_2$ and $S_3$ are closed. Upon depression of a shutter release button 29, the switch $S_1$ is closed while the transistor $Tr_2$ is driven into conduction so that the electromagnet $M_1$ is energized, thereby attracting an armature 17. Therefore, the aperture ring 3 becomes released from an armature 17 and is rotated in the counterclockwise direction by means of a spring 18 so that the aperture diaphragm 2 may close the aperture while the capacitor C begins to charge. After the time elapse of $T_1$ sec., that is, at the time $t_1$ in FIG. 3, the charging voltage of the capacitor C becomes $V_1$ so that the transistors $Tr_1$ and $Tr_3$ are switched "On" while the transistor $Tr_2$ is switched "Off," thereby de-energizing the electromagnet $M_1$. Therefore, the armature 17 is rotated by means of a spring 19 and thereby engages with teeth 20 on the aperture ring 3 so that the ring 3 is locked in position. To sum up, the aperture 1 is set depending upon the aperture of the photoconductor $CdS_2$ which in turn is set by the aperture openings 13 and 15 depending upon the selected shutter speed. In this case, the capacitor C may be preferably selected to have a relative large capacitance and the base current of the transistor $Tr_1$ and the dark resistance of the photoconductor $CdS_2$ are selected to be small in order to utilize the linear portion of the charging curve of the capacitor, so that the charged voltage of the capacitor C will rise beyond up to the break-down voltage ($V_D$) of the Zener diode D connected in parallel with the capacitor C. That is, the charged voltage approaches a predetermined value, which becomes a reference voltage used in fixed shutter speed photography. In this case, the voltage $V_D$ may be equal to the voltage $V_1$. However, since the voltage $V_D$ is maintained at a constant value with the relation of $V_D > V_1$, the voltage $V_D$ is preferably so selected that the time T required for raising the voltage from $V_1$ to $V_D$ is shorter than the time $T_1$ required until the aperture ring is locked in position. Upon conduction of the transistor $Tr_3$, the electromagnet $M_2$ is energized so that the shutter is closed and the mechanism from 4 to 7 is held. Upon rotation of the armature 17 in the direction at which the aperture ring 3 is locked in position, a release member 21 releases a drive lever 22 through a delay mechanism interlocked with the aperture ring 3 so that a sector ring 24 is rotated in the clockwise direction by means of a spring 23, thereby opening the shutter sector. When the sector ring 24 is rotated, consequently the film is exposed. At the same time, the switch $S_3$ is switched to the contact a, so that the charge across the capacitor C (having a potential $V_D$) is discharged through the resistor $R_5$, whose resistance has been set as above described along with the selection of shutter speed. The path of current flow from the capacitor C to the resistor $R_5$ is through the switch $S_4'$, its contact $d'$ and the sliding arm 10. Thus after the time interval $T_2$ sec. the voltage $V_A$ reaches $V_2$, that is, the Off-Level voltage, so that the transistors $Tr_1$ and $Tr_3$ are switched "Off" while the transistor $Tr_2$ is switched "On," whereby the electromagnet $M_2$ is de-energized. Thus, the armature 4 is released therefrom and rotated in the counterclockwise direction by a spring $4_1$, thereby releasing a pawl 5. Therefore, a pin $6_1$ of a lever 6 rotates from the position indicated in FIG. 4 in the counterclockwise direction so as to strike the stepped portion $22_1$ of a member 22, thereby closing the shutter. When the resistor $R_4$ in the circuit diagram of FIG. 1 is variable or adjustable, the loop gain of the Schmitt circuit is varied, thereby varying the On and Off levels $V_2$ and $V_3$ shown in FIG. 2 so as to adjust the circuit depending upon the sensitivity of the film to be used.

So far the present invention has been described as the dark resistance of the photoconductor $CdS_2$ being kept low. However, when it is still dark even when the aperture is wide-opened so that the dark resistance is still high and the potential $V_A$ will not reach $V_D$, the resistor $R_6$ connected in parallel with the photoconductor $CdS_2$ functions so as to raise the potential $V_A$ to a lead $V_D$ by the current flowing through the resistor $R_6$. The resistance of the resistor $R_6$ is sufficiently high as compared with the resistance of the photoconductor $CdS_2$ during the normal condition, so that the resistor $R_6$ will not affect the time constant of the RC circuit under normal conditions.

Next the invention as applied to programmed shutter photography will be described. When the button 8 (FIG. 4) is set to the mark 25, the switch $S_4$ is switched to the contact c while the photoconductor $CdS_1$ ($\gamma=0.5$) is connected in series with the capacitor C, thereby forming a CR time constant circuit therewith. The variable or adjustable resistor $R_5$ is adjusted by the rotation of the aperture ring 3. For example the pin 26 planted on a sliding plate 27 is in engagement with the aperture ring 3 and a slider 28 is made to slide along the resistor $R_5$ and is connected to the contact a of the switch $S_3$ through the contact $c'$ of the switch $S_4'$. As in the case of fixed shutter speed photography, the shutter release button 29 is released, then after the capacitor C reaches a predetermined charge the transistor $Tr_1$ is switched "On." Next the transistor $Tr_2$ is switched "Off" and thereafter the transistor $Tr_3$ is switched "On" in the stated sequence after the time determined by the incident light upon the photoconductor $CdS_2$. At the time $t_1$ in FIG. 3, the opening size of the aperture 1 is determined in response to the intensity of the light of a subject to be photographed. The time $t_3$, which represents shutter speed, is selected by the current discharge into the resistor $R_5$ whose resistance is set by the above described setting of the aperture 1. As described hereinabove, in accordance with the present invention, one electronic switching circuit is used for controlling not only an aperture but also a shutter speed or exposure time in response to the aperture adjustment by utilizing the charging and discharge of the capacitor so that both the aperture and the shutter speed may be controlled in a simple manner. Since the diode D or the like is connected in parallel with the charging and discharge capacitor and since the charged voltage of the capacitor is set to a predetermined voltage $V_D$, the shutter speed control is effected with a higher degree of accuracy. Furthermore, two photoconductive elements each having a different incident-light vs. output current characteristic $\gamma$ are provided so as to be selectively connected to the capacitor in the CR circuit, so that both fixed shutter speed photography and programmed shutter photography may be advantageously carried out by utilizing only one electronic switching circuit.

Figure 5:
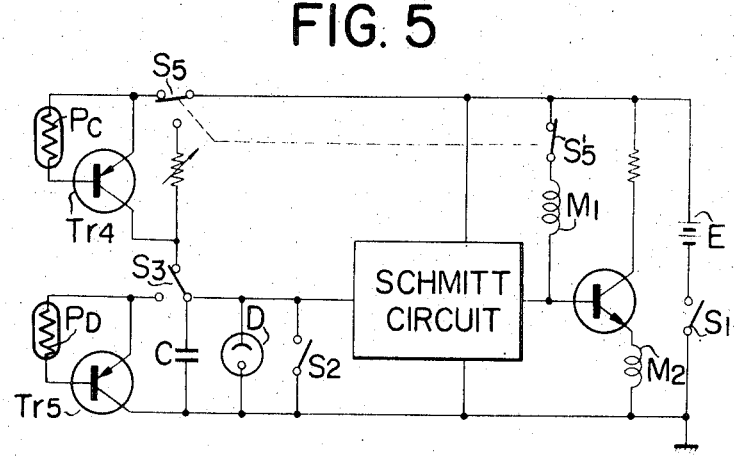
FIGS. 5, 6, 7 and 8 are circuit diagrams of another embodiment of the apparatus in accordance with the present invention.

FIG. 5 shows another embodiment of the apparatus in accordance with the present invention. In FIG. 5, the combination of a photocell Pc and transistor $Tr_4$ is used as a first resistive means. On the other hand, the combination of a photocell $P_D$ and transistor $Tr_5$ is used as a second resistive means. A switch $S_5$ is ganged with a switch $S_5'$. In the case of the programmed photography, the transistor $Tr_4$ is controlled in response to its base potential which varies in accordance with the brightness of the object to be photographed. Therefore, during the charging process of the capacitor, the Schmitt circuit is triggered at level $V_1$ and at the same time the aperture is set or preset by the magnet $M_1$. Then, the capacitor C is connected to the transistor $Tr_5$ along with the photocell $P_D$. The photocell $P_D$ which is responsive to the change of brightness during the exposure affects the shutter time. Alternatively, the photocells $P_C$ and $P_D$ may be replaced by photo-diodes. Manual operation is performed by connecting the switch $S_5$ to the bypass resistor. It is apparent that in such case the magnet $M_1$ is not operated.

Figure 6:
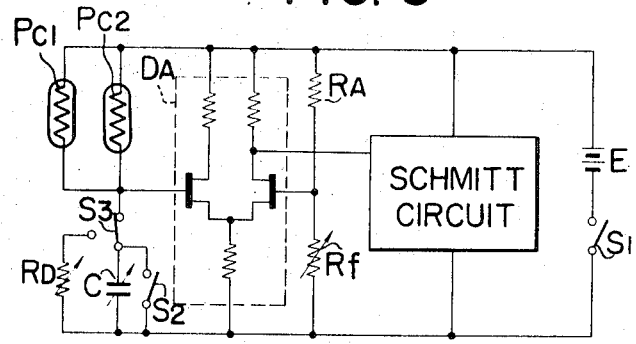

Still another embodiment of the apparatus is shown in FIG. 6. As the first resistive means, two parallel photoconductive elements $P_{C_1}$ and $P_{C_2}$ are provided to increase the range of linear operation. As shown in the figure, the input circuit of the apparatus comprises a comparator having a bridge circuit and a differential amplifier DA connected across the detecting terminals of the bridge circuit. The resistor Rf forming one arm of the bridge is adjusted to compensate for resistance of the photoconductive elements $P_{C_1}$ and $P_{C_2}$.

Figure 7:
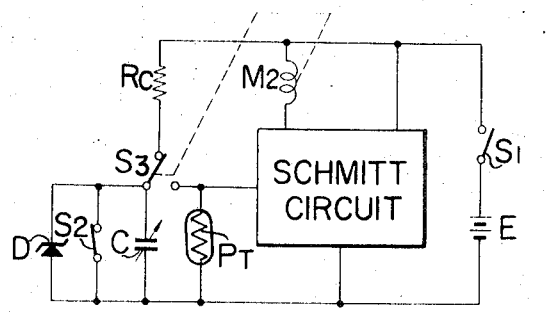

FIG. 7 is a circuit diagram of another modified embodiment of the apparatus in accordance with the present invention. In the figure, the shutter drive magnet $M_2$ which is included in Schmitt circuit, is released upon the actuation of the Schmitt circuit to disconnect the capacitor C from the discharge path including the second resistive means $P_T$. Then, the charging path having the first resistive means Rc is formed to charge the capacitor C.

Figure 8:
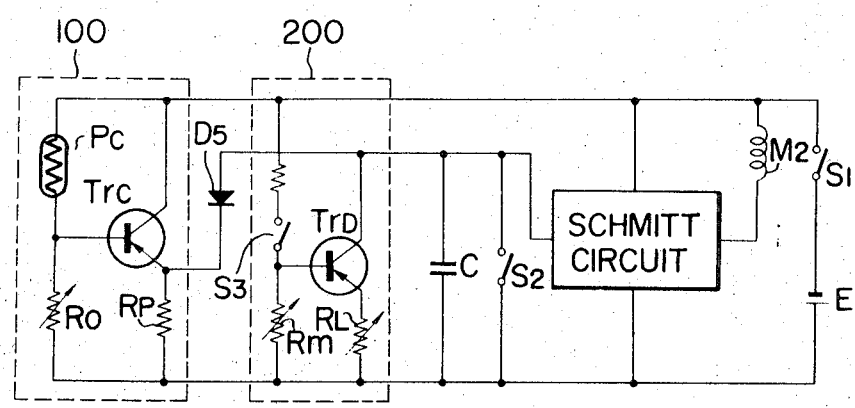

FIG. 8 shows another modified embodiment of the apparatus in accordance with the present invention. In the figure, the first resistive means 100 comprises a transistor $Tr_C$ connected in an emitter follower configuration, a photoconductive element $P_C$ connected across the base-collector path of the transistor, a variable resistor $R_O$ connected to the base of the transistor and a resistor $R_P$ connected to the emitter of the transistor. The second resistive means 200 comprises a transistor $Tr_D$, a variable resistor $R_L$ connected to the emitter and a variable resistor $R_m$ connected to the base of the transistor. Between the first and second resistive means is connected a diode $D_5$ which is rendered conductive during the charging of the capacitor C and is rendered non-conductive during the discharge of the same capacitor C. In operation, after opening the switch $S_2$ manually the capacitor C is charged through the path including the forward diode $D_5$ and the first resistive means 100 which operates under the control of the photoconductive element Pc which responds to the brightness of the object to be photographed and the variable resistor Ro of which resistance value is set in response to the film sensitivity. Therefore, the charged potential across the capacitor C corresponds to the exposure value. When the switch $S_3$ is turned on, the capacitor C is discharged through the emitter-collector path of the transistor $Tr_D$ under the control of the variable resistor $R_m$. In this case, the diode $D_5$ is available to prevent bypass current from flowing to the first resistive means. The variable resistors $R_L$ and $R_m$ control the discharging time of the capacitor. Upon the arrival of the discharging voltage at the predetermined trigger level of the switching circuit, the switching circuit is triggered to deenergize the magnet $M_2$. On the basis of the deenergization of the magnet $M_2$, the shutter is closed.

What is claimed is:

1. An exposure value controlling apparatus for cameras, which comprises an input circuit for triggering a switching circuit, said input circuit comprising a first time constant circuit including a first resistive means and a capacitor; a second resistive means connectable to said capacitor; and a switch adapted selectively to connect said capacitor to said second resistive means to discharge said capacitor upon the completion of charge of said capacitor via said first resistive means, and means for applying both charging and discharging voltages of said capacitor to said switching circuit to control triggering times of said switch circuit so that said switching circuit is first triggered during charging of said capacitor and then again triggered during discharge of said capacitor to control an exposure value.

2. An exposure value controlling apparatus according to claim 1, wherein the first resistive means is a photoconductice element, the resistance value of which varies in response to the brightness of an object to be photographed, and said second resistive means is a resistor the resistance value of which is selectively settable.

3. An exposure value controlling apparatus according to claim 1, wherein the first resistive means is a variable resistor and the second resistive means is a photoconductive element the resistance value of which varies in response to the brightness of an object to be photographed.

4. An exposure value controlling apparatus according to claim 1, wherein at least one of the resistive means comprises at least two photoconductive elements having different incident light versus output current characteristics, said photoconductive elements being selectively connected to the capacitor, thereby to accomplish at least two operations of fixed shutter speed photography, programmed photography and fixed aperture shutter photography on a manual or automatic basis.

5. An exposure value controlling apparatus according to claim 1, wherein the input circuit comprises a comparator such as a bridge circuit and a differential amplifier.

6. An exposure value controlling apparatus according to claim 1, wherein the switching circuit comprises a Schmitt circuit including input and output transistors, said Schmitt circuit having two different trigger levels, one for charging and the other for discharging of said capacitor.

7. An exposure value controlling apparatus according to claim 6, wherein the Schmitt circuit has a variable resistor connected to a collector of the input transistor to vary a trigger voltage thereby enabling to change a film sensitivity.

8. An exposure value controlling apparatus according to claim 6, wherein the Schmitt circuit has a variable resistor connected to the base of the output transistor, thereby to permit a trigger voltage of said output transistor to be adjusted in response to a stop value of an aperture.

9. An exposure value controlling apparatus according to claim 1, wherein a constant voltage regulator element, such as a Zener diode, is connected in parallel with the capacitor; the switching circuit being first triggered by said capacitor during charging, and said switching circuit being then operated responsive to discharge of said capacitor to effect a time control for a shutter mechanism said capacitor at the start of said discharge being at the break-down voltage of said constant voltage element, said break-down voltage being at least as high as at least one of trigger levels of said switching circuit.

10. An exposure value controlling apparatus according to claim 1, wherein at least one of the first and second resistive means consists of at least one photoconductive element to provide a wide linear operating range to said apparatus.

11. An exposure value controlling apparatus according to claim 1, wherein the capacitor is variable to permit an exposure index to be adjusted.

12. An exposure value controlling apparatus according to claim 1, wherein an external means is energized upon the discharge of said capacitor to control said external means.

13. An exposure value controlling apparatus according to claim 1, wherein both of the first and second resistive means are photoresistive devices.

14. An exposure value controlling apparatus for cameras, which comprises an input circuit for triggering a switching circuit, said input circuit comprising a first time constant circuit including a first resistive means and a capacitor; a second resistive means connectable to said capacitor; and a switch adapted selectively to connect said capacitor to said second resistive means upon the completion of charge of said capacitor via said first resistive means, and a one-way switch, such as a diode, arranged to connect said first time constant circuit and said second resistive means to each other in a way that said one-way switch is rendered conductive during the charging of said capacitor and is rendered non-conductive during the discharge of said capacitor.

15. An exposure value controlling apparatus for use in cameras, said apparatus comprising a transistor switching circuit for setting an aperture of a photographic lens, a CR time constant circuit for applying an input to said transistor switching circuit, said CR time constant circuit comprising a capacitor and two photoconductor elements, each having different characteristics of incident light versus output current and means for connecting one of said elements selectively in series with said capacitor; means responsive to the actuation of a shutter opening means for disconnecting said capacitor from the selected one photoconductor element and connecting said capacitor in series with a resistor; whereby said capacitor is discharged through said resistor; thereby determining the time at which means for closing the shutter is actuated; means responsive to a given discharge of said capacitor to actuate the shutter closing means, whereby one electronic shutter circuit is used both for a fixed shutter speed photography and a programmed shutter photography; said resistor being adjustable to a resistance value corresponding to a desired shutter speed by the manual setting of a shutter speed ring in case of the fixed shutter speed photography, whereas in case of the programmed shutter photography said resistor is automatically set to a resistance value depending upon the aperture set.

References Cited
UNITED STATES PATENTS

| | | | |
|---|---|---|---|
| 3,205,795 | 9/1965 | Grey | 95—10 C |
| 3,292,516 | 12/1966 | Sato et al. | 95—10 C |
| 3,324,779 | 6/1967 | Nobusawa et al. | 95—10 C |
| 3,416,421 | 12/1968 | Biedermann et al. | 95—10 C |
| 3,466,447 | 9/1969 | Fahlenberg | 95—10 X |
| 3,526,177 | 9/1970 | Kiper et al. | 95—10 |

SAMUEL S. MATTHEWS, Primary Examiner
M. L. GELLNER, Assistant Examiner

U.S. Cl. X.R.
95—10 C D

UNITED STATES PATENT OFFICE
CERTIFICATE OF CORRECTION

Patent No. 3,721,167                    Dated  March 20, 1973

Inventor(s) Mitsutoshi Ogiso

It is certified that error appears in the above-identified patent and that said Letters Patent are hereby corrected as shown below:

Column 2, line 59, "circuitry" to read --circuit--;

line 65, after the word "circuit" insert --a--;

Column 5, line 63, substitute --level-- for "lead";

Column 7, line 53, substitute --conductive-- for "conductice".

Signed and sealed this 26th day of February 1974.

(SEAL)
Attest:

EDWARD M. FLETCHER, JR.           C. MARSHALL DANN
Attesting Officer                 Commissioner of Patents